(12) United States Patent
Hashimoto et al.

(10) Patent No.: US 8,735,763 B2
(45) Date of Patent: May 27, 2014

(54) POWER SUPPLY DEVICE FOR ELECTRICAL DISCHARGE MACHINE

(75) Inventors: Takashi Hashimoto, Tokyo (JP);
Taichiro Tamida, Tokyo (JP);
Takayoshi Nagai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 541 days.

(21) Appl. No.: 13/061,719

(22) PCT Filed: Mar. 9, 2009

(86) PCT No.: PCT/JP2009/054464
§ 371 (c)(1),
(2), (4) Date: Mar. 2, 2011

(87) PCT Pub. No.: WO2010/026790
PCT Pub. Date: Mar. 11, 2010

(65) Prior Publication Data
US 2011/0163071 A1    Jul. 7, 2011

(30) Foreign Application Priority Data

Sep. 2, 2008    (JP) .................................. 2008-224619

(51) Int. Cl.
*B23H 1/02*    (2006.01)
(52) U.S. Cl.
CPC ...................................... *B23H 1/022* (2013.01)
USPC ..................................... 219/69.13; 219/69.18
(58) Field of Classification Search
USPC ........................................... 219/69.13, 69.18
See application file for complete search history.

(56) References Cited

U.S. PATENT DOCUMENTS

| | | | | |
|---|---|---|---|---|
| 5,580,469 A | * | 12/1996 | Magara | 219/69.18 |
| 5,903,067 A | | 5/1999 | Sato et al. | |
| 2006/0249483 A1 | * | 11/2006 | D'Amario | 219/69.18 |

FOREIGN PATENT DOCUMENTS

| | | | |
|---|---|---|---|
| JP | 38 1197 | | 2/1963 |
| JP | 42 23880 | | 11/1967 |
| JP | 50 103791 | | 8/1975 |
| JP | 52 90895 | | 7/1977 |
| JP | 61-260922 A | * | 11/1986 |
| JP | 5 177435 | | 7/1993 |
| JP | 10 309629 | | 11/1998 |
| JP | 11-129119 A | * | 5/1999 |
| JP | 11-333632 A | * | 12/1999 |
| JP | 11-347842 A | * | 12/1999 |
| JP | 3361057 | | 1/2003 |
| JP | 2005-329496 A | * | 12/2005 |
| JP | 2005 329498 | | 12/2005 |
| JP | 2006 312229 | | 11/2006 |

OTHER PUBLICATIONS

International Search Report issued May 19, 2009 in PCT/JP09/054464 filed Mar. 9, 2009.

\* cited by examiner

*Primary Examiner* — Geoffrey S Evans
(74) *Attorney, Agent, or Firm* — Oblon, Spivak, McClelland, Maier & Neustadt, L.L.P.

(57) ABSTRACT

A switching element operates to be turned on or off at a frequency in the order of megahertz. A reactor supplies a resonance current generated by resonance of the reactor with a floating capacitance between electrodes to between the electrodes. The resonance current does not flow in a direct-current power supply. By turning a capacitor and a floating inductance into a serial resonant state, the reactor ideally supplies the resonance current to between the electrodes without influence of the floating inductance. A high-frequency voltage asymmetric in positive and negative polarities is applied to between the electrodes and a current pulse can be made into a short pulse. Therefore, finish machining with high surface roughness can be performed.

20 Claims, 7 Drawing Sheets

POWER SUPPLY DEVICE FOR ELECTRICAL DISCHARGE MACHINE

TECHNICAL FIELD

The present invention relates to a power supply device for an electrical discharge machine for applying a machining voltage to between electrodes constituted by a wire electrode and a workpiece that are arranged to face each other while alternately changing over the polarity of the voltage. More particularly, the present invention relates to a power supply device for an electrical discharge machine used for finish machining.

BACKGROUND ART

A wire electric discharge machining device is a device that machines a workpiece using arc discharge generated between electrodes constituted by a wire electrode and the workpiece that are arranged to face each other. This wire electric machining device improves surface roughness by lowering a machining current from a rough machining condition using a relatively high machining current (such as a current at a pulse width of about several tens of microseconds) step by step, and by using a finish machining condition using a machining current at a current pulse width finally reduced down to about several tens of nanoseconds. To achieve this, some wire electric machining devices include a plurality of switchable power supply devices (power supply devices for an electrical discharge machine) that can supply a machining current corresponding to various machining conditions from the rough machining condition to the finish machining condition, respectively.

In finish machining, a high-frequency voltage in the order of megahertz is generally used as a machining voltage so as to improve the surface roughness of the workpiece, and a sinusoidal voltage that can be realized with a simple configuration is used as the high-frequency voltage or the machining voltage.

There have been conventionally proposed various types of power supply devices for an electrical discharge machine for improving the surface roughness of a workpiece (see, for example, Patent Documents 1 to 3).

A power supply device for an electrical discharge machine disclosed in Patent Document 1 is described using reference numerals shown in FIG. 1 of the patent document. The power supply device includes a direct-current (DC) power supply V1, a switching element S1 having one end connected to a positive electrode terminal of the DC power supply V1 via a line inductance LINE (a reactor) and to one end of an inter-electrode GAP, and a switching element S2 having one end, along with the other end of the switching element S1, connected to a negative electrode terminal of the DC power supply V1 and having the other end connected to the other end of the inter-electrode GAP.

If the power supply device is configured as described above, a boost-up voltage is generated when the switching element S1 performs a switching operation. At this time, the boost-up voltage charges a floating capacitance Cf present in the switching element S2 and the inter-electrode GAP by keeping the switching element S2 to be turned off. The surface roughness can be expected to improve by a surge short-pulse current flowing in the inter-electrode GAP at the time of charging. Further, the floating capacitance Cf limits the current flowing in the inter-electrode GAP. After a flow of a predetermined amount of current in the inter-electrode GAP, the switching element S2 is turned on. Electric charge accumulated in the floating capacitance Cf is thereby consumed, and the switching element S2 returns to an initial state. A capacitor can be provided in parallel with the switching element S2.

Patent Document 2 discloses a power supply device for an electrical discharge machine, which includes a high-frequency power supply having a resonance frequency determined by a floating capacitance and an inductance between electrodes. Because of use of resonance, the voltage generated between the electrodes is not a bipolar-pulse voltage but a sinusoidal voltage.

Moreover, Patent Document 3 discloses a technique capable of obtaining high surface roughness by changing levels of a machining current using a positive pulse and a negative pulse. It is considered that the high surface roughness can be obtained due to a change of an inter-electrode discharge state between a time of applying the positive pulse and a time of applying the negative pulse.

Patent Document 1: Japanese Patent Application Laid-open No. 2005-329498
Patent Document 2: Japanese Patent Application Laid-open No. H5-177435
Patent Document 3: Japanese Patent No. 3361057

DISCLOSURE OF INVENTION

Problem to be Solved by the Invention

A case of performing a high-frequency operation in a circuit configuration described in Patent Document 1 is considered here. In Patent Document 1, the reactor is used solely for chopper control but is estimated to resonate with the floating capacitance included in the switching element S2 as a result of the high-frequency operation. At this time, the switching element S1 is turned on or off, thereby generating a surge voltage. Due to this, despite a resonance operation, it is considered that a voltage having a distorted waveform accompanying an oscillating component is applied to between the electrodes instead of applying a sinusoidal voltage as described in Patent Document 2. That is, a pulse asymmetric in positive and negative polarities is basically applied to between the electrodes as described in Patent Document 3. This can be considered to be effective for improvement of the surface roughness.

However, the circuit configuration described in Patent Document 1 has the following problems. Because the resonance current flows via the DC power supply V1, (1) the resonance current makes the DC power supply perform an unstable operation and (2) a loss occurs to the resonance current due to an internal impedance of the DC power supply. The problems are described specifically below.

(1) Unstable Operation of DC Power Supply

Generally, the DC power supply is controlled to keep supplying a fixed voltage. If the DC power supply interposes in a loop of the resonance current, there is a probability that the DC power supply oscillates itself and lacks stabilities of operations. An inter-electrode state is not always fixed but rather greatly changes, for example, from a non-discharge state (impedance value: several tens of kilo-ohms to several ohms) to a discharge state (impedance value: several milli-ohms to several ohms), a short-circuit state (impedance value: several nano-ohms to several milli-ohms). Particularly in the non-discharge state, the inter-electrode state can be considered not as a resistor but as a capacitor having an inter-electrode capacitance. In this case, if the oscillation generated by the DC power supply does not match with the capacitor formed between the electrodes, the inter-electrode voltage varies more than necessary, possibly resulting in unstable machining. Alternatively, the surface roughness possibly falls unnecessarily.

(2) Loss Due to Internal Impedance

Impedance is present in the DC power supply. By configuring the DC power supply to cause the resonance current to flow via inside of the DC power supply, not a small loss occurs to the resonance current. Furthermore, an internal inductance component of the DC power supply is a part of a resonance constant. Due to this, change of a configuration or state of the DC power supply destroys the resonance, so that desired resonance current does not flow in between the electrodes. This makes it difficult to achieve stable machining.

The present invention has been achieved in view of the above problems, and an object of the present invention is to provide a power supply device for an electrical discharge machine capable of eliminating unstable operations of a DC power supply and a loss due to internal impedance, and capable of stably performing finish machining with high surface roughness when the power supply device is configured to include the DC power supply, a switching element, and a reactor.

Means for Solving Problem

In order to achieve the above-mentioned object, the present invention provides a power supply device for an electrical discharge machine for applying a pulse voltage to between electrodes constituted by an electrode and a workpiece, respectively, the power supply device comprising: a direct-current power supply; a capacitor connected in series to between the electrodes; a reactor connected in parallel with a serial circuit, and having one end connected to one end of the direct-current power supply, the serial circuit being constituted by the electrodes and the capacitor; and a switching element having one end connected to other end of the direct-current power supply and other end connected to other end of the reactor.

Effect of the Invention

According to the present invention, when the power supply device is configured to include the DC power supply, the switching element, and the reactor, it is possible to eliminate unstable operations of the DC power supply and a loss due to internal impedance, and to stably perform finish machining with high surface roughness.

EXPLANATIONS OF LETTERS OR NUMERALS $1a$, $1b$, $1c$, $1d$, $1e$, $1f$ Power supply device for electrical discharge machine
2 Wire electrode
3 Workpiece
V1 DC power supply
SW1, SW2, SW3, SW4 Switching element
L1 Reactor
C1, C2, C11, C21, C22 Capacitor
Lx Floating inductance
Ly Reactor (inductive load)
Cy Capacitor (capacitive load)
T1 Transformer

BEST MODE(S) FOR CARRYING OUT THE INVENTION

Exemplary embodiments of a power supply device for an electrical discharge machine according to the present invention will be explained below in detail with reference to the accompanying drawings. The present invention is not limited to the embodiments.

First Embodiment

Figure 1:
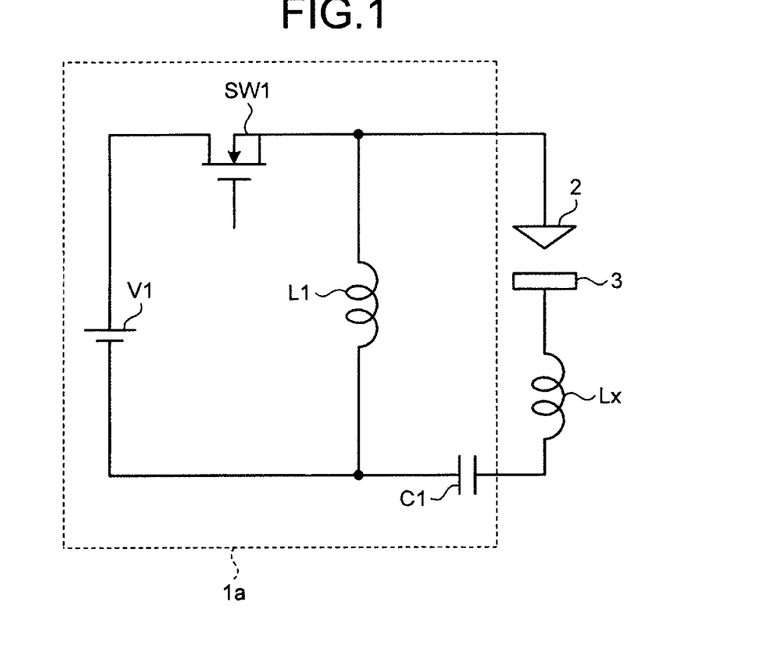
FIG. 1 is a circuit diagram of a configuration of a power supply device for an electrical discharge machine according to a first embodiment of the present invention.

FIG. 1 is a circuit diagram of a configuration of a power supply device for an electrical discharge machine according to a first embodiment of the present invention. In FIG. 1, a power supply device for an electrical discharge machine $1a$ is a power supply device that alternately applies machining voltages which is adapted to a finish machining condition to between electrodes constituted by a wire electrode 2 and a workpiece 3 that are arranged to face each other by switching their polarities, and generates an arc discharge between the electrodes required for the finish machining of the workpiece 3.

A power supply cable connects the power supply device for an electrical discharge machine $1a$ to between the electrodes. Not low floating inductance is present near between the electrodes, particularly the power supply cable connecting the power supply device for an electrical discharge machine $1a$ to between the electrodes. Lx shown in FIG. 1 denotes the floating inductance. While FIG. 1 depicts only the floating inductance present on a workpiece 3 side, floating inductance is also present on a wire electrode 2 side.

The power supply device for an electrical discharge machine $1a$ is configured to include the DC power supply V1, a switching element SW1, a reactor L1, and a capacitor C1.

In the example shown in FIG. 1, the switching element SW1 is an FET (Field Effect Transistor). A drain terminal serving as one end of the switching element SW1 is connected to, for example, a positive electrode terminal of the DC power supply V1. A source terminal serving as the other end of the switching element S1 is connected, together with one end of the reactor L1, to the wire electrode 2, for example. A control circuit (not shown) supplies a control signal at a switching frequency in the order of megahertz to a gate terminal of the switching element SW1.

The reactor L1 has an inductance value that turns into a resonant state with a floating capacitance between the electrodes at the frequency in the order of megahertz. In the example shown in FIG. 1, the other end of the reactor L1 is connected to a negative electrode terminal of the DC power supply V1 and also connected to the workpiece 3.

A capacitance value of the capacitor C1 is selected so that the capacitor C1 resonates with the floating inductance Lx. In the example shown in FIG. 1, the capacitor C1 is interposed on a connection path connecting the other end of the reactor L1 to the workpiece 3. Alternatively, the capacitor C1 can be interposed on a connection path connecting one end of the reactor L1 to the wire electrode 2. That is, a serial resonance circuit constituted by the capacitor C1 and the floating inductance Lx is connected to between the electrodes in series.

Note that the capacitor C1 does not always take the form of a so-called capacitor. For example, a capacity between a central conductor and an outer-surface conductor of a coaxial cable can be used as the capacitor C1. Alternatively, a necessary capacitance value can be realized using an insulator (a dielectric) such as a ceramic substrate.

Figure 2:
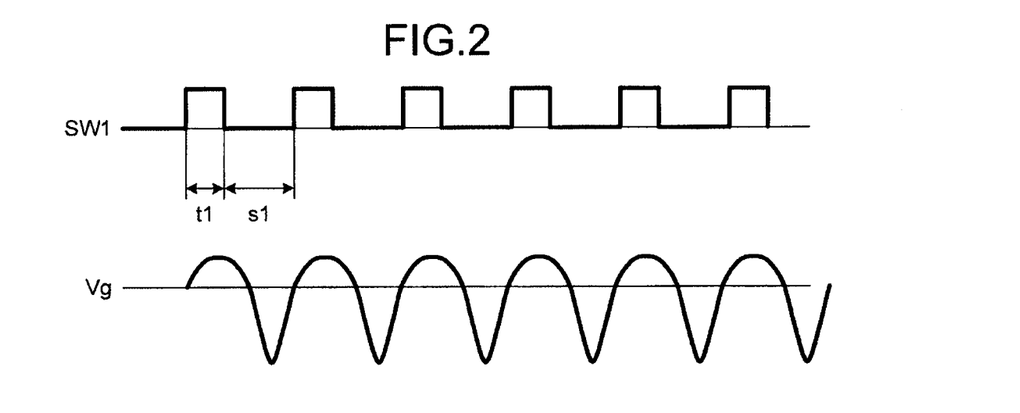
FIG. 2 depicts an example of a waveform of a control signal supplied to a switching element shown in FIG. 1 and a waveform of a voltage applied to between electrodes during supply of the control signal.

An operation of the first embodiment is described next with reference to FIG. 2. FIG. 2 depicts an example of a waveform of the control signal supplied to the switching element shown in FIG. 1 and a waveform of a voltage applied to between the electrodes during supply of the control signal.

As shown in FIG. 2, a control signal having an ON-time width of a period t1 and an OFF-time width of a period s1 is input to the gate terminal of the switching element SW1 from a control circuit (not shown). The switching element SW1 performs a switching operation according to this control pattern at the high frequency in the order of megahertz. Accordingly, a high-frequency voltage, as denoted as Vg shown in FIG. 2, at a waveform asymmetric in positive and negative polarities is applied to between the electrodes by action of the reactor L1 and the capacitor C1 to be described later.

In the period t1 in which the switching element SW1 is turned on, current flows from the DC power supply V1 to the reactor L1. Energy accumulated in the reactor L1 at the moment the switching element SW1 is turned off is output to between the electrodes.

Providing that a switching operation frequency of the switching element SW1 is a high frequency, for example, equal to or higher than 5 megahertz, a resonant state is produced between the reactor L1 and the floating capacitance between the electrodes, whereby a continuous pulse can be stably applied to between the electrodes.

In this case, it is necessary to make a current pulse short to improve surface roughness of the workpiece 3. However, rising of a steep pulse generated in the reactor L1 the moment the switching element SW1 is turned off delays due to the floating capacitance between the electrodes and the floating inductances Lx present in the power supply cable. This makes it difficult to make the current pulse formed into a short pulse.

Considering this, a constant of the capacitor C1 is selected so that the capacitor C1 resonates with the floating inductance Lx, and the capacitor C1 is interposed in series with between the electrodes. If the capacitor C1 and the floating inductance Lx turn into a serial resonant state, the resonance current resulting from energy produced in the reactor L1 can be ideally supplied to between the electrodes without influence of the floating inductance Lx. This can make the current pulse flowing in between the electrodes short.

Because this resonance current flows in between the electrodes and the reactor L1 without via the DC power supply V1, there is no loss in the resonance current due to an internal impedance of the DC power supply V1. This resonance current also has no effect on the DC power supply V1. It is thereby possible to stably supply a high-frequency pulse to between the electrodes and stably perform machining with high surface roughness.

Significance of the presence of the capacitor C1 is described here. The inductance Lx is the floating inductance and can considered to be quite low as compared with at least the reactor L1. Providing that the capacitor C1 that also functions to cut off a DC component is not inserted into a system, a current of the DC power supply flows in between the electrodes the moment the switching element SW1 starts to be turned on. Discharge occurs depending on a value of the voltage applied to between the electrodes. Discharge current at this time is quite high because of no intervention of a resistance (absence of a current-limiting resistance).

This deteriorates the surface roughness. Alternatively, short-circuit current flows when the electrodes are shorted to each other. When current flows in the switching element SW1 by an amount equal to or higher than a design value, the switching element SW1 is possibly broken. Conversely, it is necessary to select a high-current element that can endure the short-circuit current as the switching element, which makes the circuit complicated and expensive.

In contrast, when the capacitor C1 is inserted into the system in series as shown in FIG. 1, the power supply current charges up the capacitor C1 and stops flowing. Due to this, there is no rise in the inter-electrode voltage unnecessarily and the short-circuit current does not flow continuously. In addition, this capacitor C1 keeps the inter-electrode voltage 0 V on average.

Nevertheless, as shown in FIG. 2, the voltage applied to between the electrodes is not necessarily symmetric in positive and negative polarities. That is, while an area (a charge amount) of a current waveform is symmetric in positive and negative polarities, a distorted waveform shown in FIG. 2 is obtained because a peak current depends on on/off timings of the reactor L1 and the switching element SW1 forming a surge pulse. At this time, it is possible to expect the improvement of the surface roughness if polarities of the applied voltage are set so that the peak current is higher on the workpiece 3 side than the wire electrode 2 side.

As described above, according to the first embodiment, the resonance current generated by the resonance of the reactor with the floating capacitance between the electrodes does not flows in the DC power supply and ideally flows in between the electrodes when a capacitive load (the capacitor C1, a coaxial cable or an insulator) resonates with a floating inductance.

That is, because the resonance current generated in the reactor does not flow via the DC power supply, the DC power supply is free from an unstable state and there is no loss in the resonance current supplied to between the electrodes due to the internal resistance of the DC power supply. Furthermore, stable finish machining with the high surface roughness can be ensured because the high-frequency voltage asymmetric in positive and negative polarities is applied to between the electrodes and the current pulse can be thereby made short.

Second Embodiment

Figure 3:
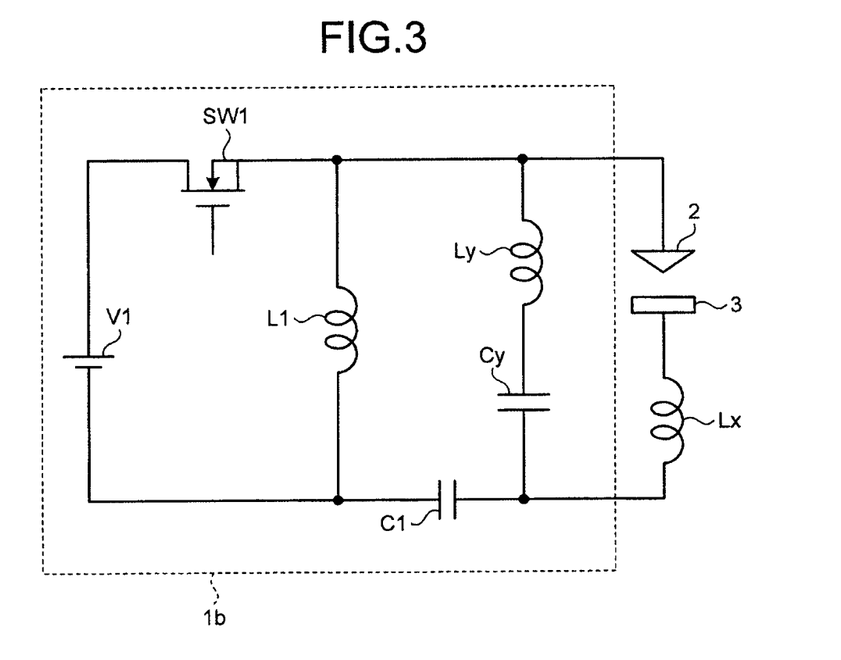
FIG. 3 is a circuit diagram of a configuration of a power supply device for an electrical discharge machine according to a second embodiment of the present invention.

FIG. 3 is a circuit diagram of a configuration of a power supply device for an electrical discharge machine according to a second embodiment of the present invention. In FIG. 3, constituent elements similar or equivalent to constituent elements shown in FIG. 1 (the first embodiment) are denoted by like reference letters or numerals. Parts relevant to the second embodiment are mainly explained below.

As shown in FIG. 3, a power supply device for an electrical discharge machine 1b according to the second embodiment is configured, as compared with the configuration shown in FIG. 1 (the first embodiment), a serial circuit including a capacitor Cy that serves as a capacitive load and a reactor Ly that serves as an inductive load is connected in parallel with between electrodes. This serial circuit is a circuit that resonates with a floating capacitance between the electrodes.

Note that the capacitor Cy does not necessarily take the form of a so-called capacitor but may be a power supply device other than a power supply device for an electrical discharge machine 1b, that is, a power supply device such as a power supply device for rough machining completed with applying a voltage to between the electrodes. Furthermore, the reactor Ly does not necessarily take the form of a so-called reactor but may be a floating inductance of, for example, a power supply cable.

Figure 4:
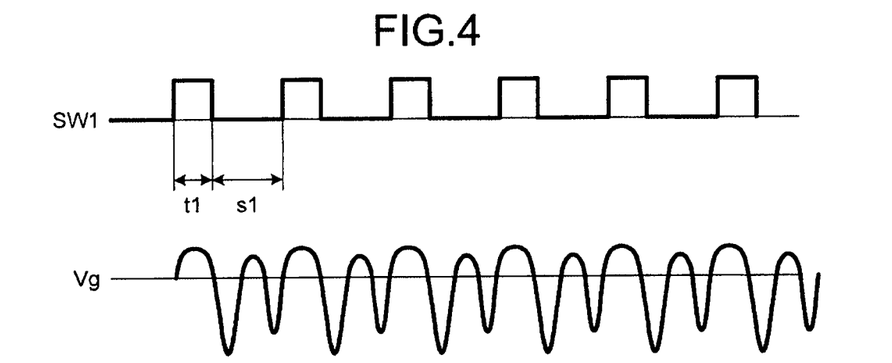
FIG. 4 depicts an example of a waveform of a control signal supplied to a switching element shown in FIG. 3 and a waveform of a voltage applied to between electrodes during supply of the control signal.

An operation of the second embodiment is described next with reference to FIG. 4. FIG. 4 depicts an example of a waveform of a control signal supplied to a switching element shown in FIG. 3 and a waveform of a voltage applied to between the electrodes during supply of the control signal. FIG. 4 differs from FIG. 2 in that a frequency of a voltage Vg applied to between the electrodes changes at a rate twice as fast as the voltage Vg shown in FIG. 2. The frequency is only an example and is not limited to that shown in FIG. 4.

With the configuration shown in FIG. 3, resonance occurs to not only between the reactor L1 and a floating capacitance between the electrodes but also to between the floating capacitance between the electrodes and the parallel circuit including the reactor Ly and the capacitance Cy. Therefore, when the reactor Ly and the capacitor Cy are appropriately selected, the voltage Vg changing at a frequency equal to or higher than an operating frequency (a switching frequency) of the switching element SW1 can be applied to between the electrodes. In this case, it goes without saying that the voltage can be stably applied as long as the frequency of the voltage Vg applied to between the electrode is an integer multiple of the operating frequency of the switching element SW1.

Such an integer-multiple resonant state is greatly damped particularly when a resonance current flows in the DC power supply V1 because of a loss in the resonance due to an internal impedance of the DC power supply. As a result, it occurs that there is a large difference in peak between a voltage waveform generated in a period t1 and that in a period s1.

In contrast, with the configuration according to the present embodiment in which the reactor L1 is in parallel with between the electrodes and that the capacitor C1 is interposed in series with between the electrodes, the resonance current does not flow via the DC power supply V1. Therefore, the difference in peak between the voltage waveform generated in the period t1 and that in a period s1 is small, and the inter-electrode voltage Vg can be applied in almost a constant voltage form, thereby making it possible to stably perform finish machining with high surface roughness.

As described above, according to the second embodiment, the resonance circuit is additionally connected to between the electrodes. Therefore, it is possible to apply the high-frequency voltage changing at a frequency (an integer-multiple frequency) equal to or higher than the switching frequency of the switching element and asymmetric in positive and negative polarities to between the electrodes, and to further improve the surface roughness from that according to the first embodiment.

Third Embodiment

Figure 5:
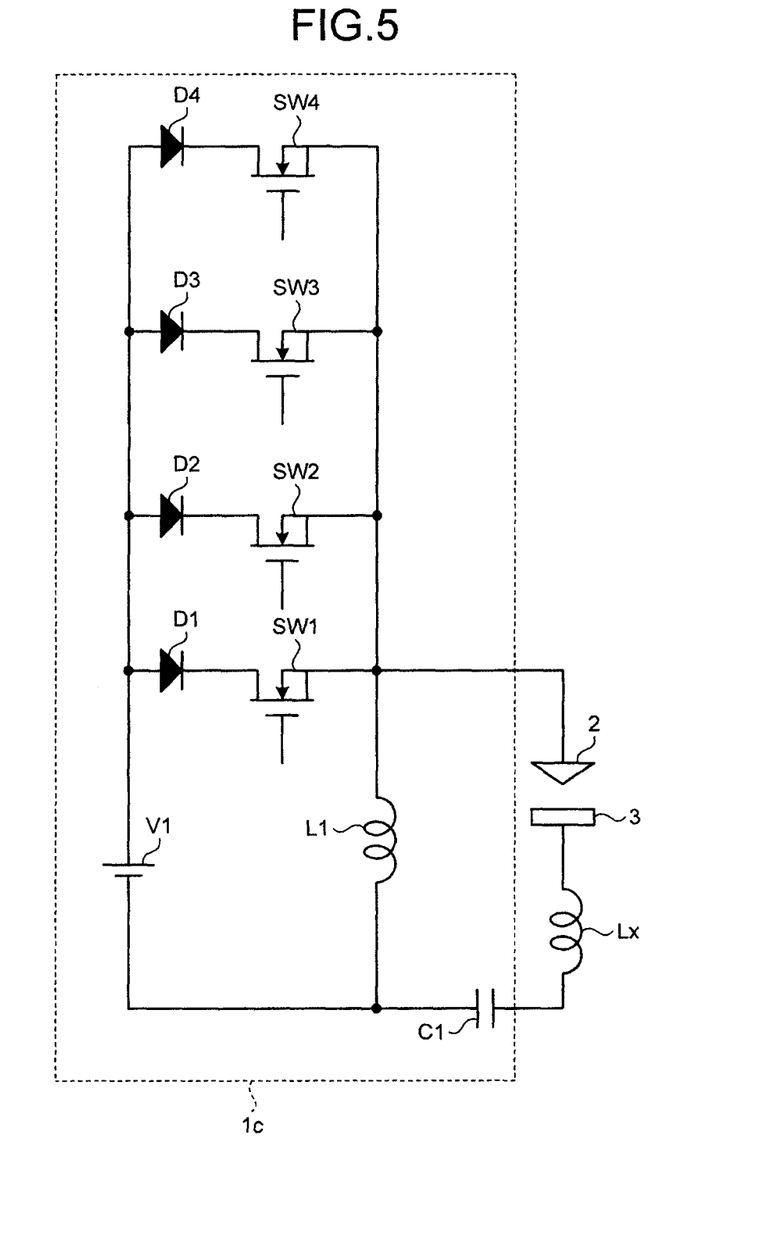
FIG. 5 is a circuit diagram of a configuration of a power supply device for an electrical discharge machine according to a third embodiment of the present invention.

FIG. 5 is a circuit diagram of a configuration of a power supply device for an electrical discharge machine according to a third embodiment of the present invention. In FIG. 5, constituent elements similar or equivalent to constituent elements shown in FIG. 1 (the first embodiment) are denoted by like reference letters or numerals. Parts relevant to the third embodiment are mainly explained below.

In the first and second embodiments, the instances in which the high-frequency voltage in the order of megahertz is applied to between the electrodes using one switch element are described. However, it is difficult for one switching element to increase the frequency of the voltage applied to between the electrodes up to that in the order of several megahertz to several tens of megahertz. Therefore, in the third embodiment, a configuration example in which a high-frequency voltage in the order of several megahertz to several tens of megahertz is applied to between electrodes using a plurality of switching elements connected in parallel is described.

As shown in FIG. 5, a power supply device for an electrical discharge machine 1c according to the third embodiment is configured, as compared with the configuration shown in FIG. 1 (the first embodiment), so that three switching elements SW2, SW3, and SW4, for example, are provided in parallel with the switching element SW1.

For stability of machining, it is important to make a resonance current flowing in between the electrodes by resonance of the reactor L1 with a floating capacitance between the electrodes independent of the DC power supply V1. However, if a resonance voltage is equal to or higher than a power supply voltage, the current possibly reversely flows in the DC power supply. Therefore, in FIG. 5, reverse-flow prevention diodes D1, D2, D3, and D4 are provided between a positive electrode terminal of the DC power supply V1 and drain terminals of the respective switching elements SW1, SW2, SW3, and SW4 with a view to making the DC power supply V1 more independent. Although illustrations and explanations thereof are omitted in FIGS. 1 and 3, reverse-flow prevention diodes are preferably provided similarly for the same purposes.

Figure 6:
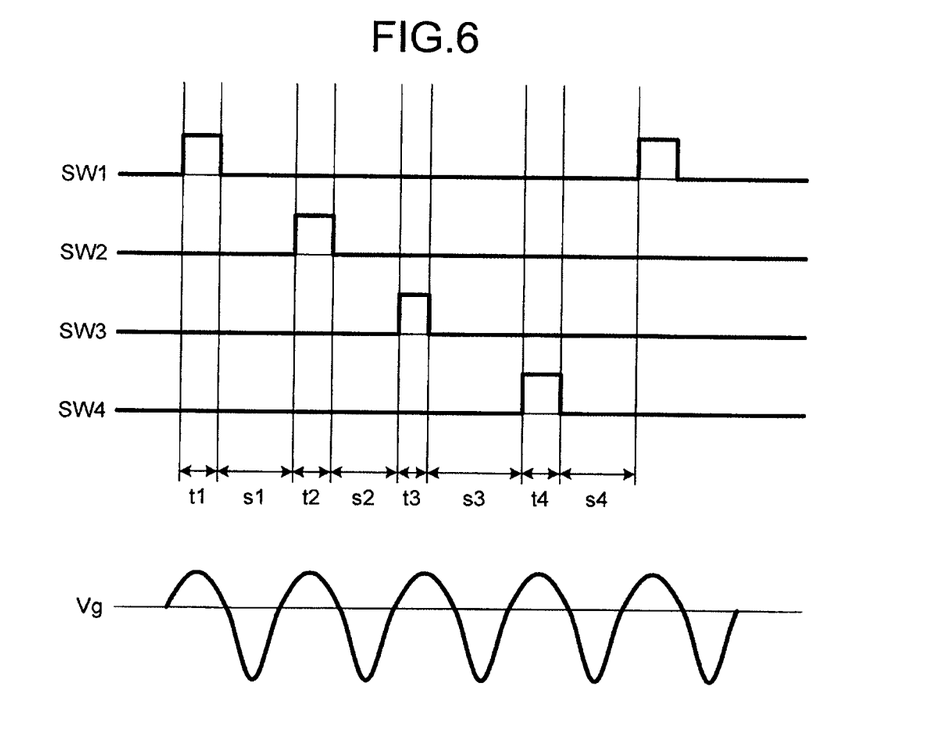
FIG. 6 depicts an example of waveforms of control signals supplied to a plurality of switching elements shown in FIG. 5 and a waveform of a voltage applied to between the electrodes during supply of the control signals.

An operation of the third embodiment is described next with reference to FIG. 6. FIG. 6 depicts an example of waveforms of control signals supplied to a plurality of switching elements shown in FIG. 5 and a waveform of a voltage applied to between the electrodes during supply of the control signals.

As shown in FIG. 6, the four switching elements SW1 to SW4 are sequentially actuated cyclically, whereby a combined frequency of a resonance current flowing in the reactor L1 can be increased while lowering operating frequencies of the four switching elements SW1 to SW4, respectively.

At this time, it can be easily imagined that the four switching elements SW1 to SW4 slightly differ in characteristics even if switching elements of the same type are selected.

Alternatively, output pulses tend to slightly differ because of the difference in wiring pattern among the switching elements SW1 to SW4.

Considering this, the switching elements SW1 to SW4 are selected to have different switching patterns so as to compensate for this irregularity. Specifically, it is assumed that a current tends to flow in the switching element SW3 more frequently than in the switching elements SW1, SW2, and SW4. Alternatively, it is assumed that the switching element SW3 is the fastest in switching rate among the switching elements SW1 to SW4. In this case, it suffices to make an ON-time width in a period t3 shorter than those in periods t1, t2, and t4 so as to make energy accumulated in the reactor L1 equal.

By doing so, the energy of the reactor L1 is equal among respective switching periods. This can reduce the irregularity related to the inter-electrode voltage and ensure stable machining performance. Likewise, if the switching elements SW1 to SW4 differ in oscillation cycle because of the slight difference in wiring, it suffices to adjust start timings of periods s1, s2, s3 and s4 that are OFF-time widths of the switching elements SW1, SW2, SW3 and SW4, respectively.

These selections are made independent. If necessary, it suffices to stagger the start timings of the ON-time forward or backward and, at the same time, to stagger the start timings of the OFF-time forward or backward. An inter-electrode voltage Vg can be thereby formed into a pulse voltage having a stable cycle and a stable voltage value.

As described above, according to the third embodiment, a chopper frequency of the reactor can be increased to be equal to or higher than the operating frequency of the switching elements. Therefore, it is possible to further increase the frequency of the voltage applied to between the electrodes and to further improve surface roughness as compared with the second embodiment.

Fourth Embodiment

Figure 7:
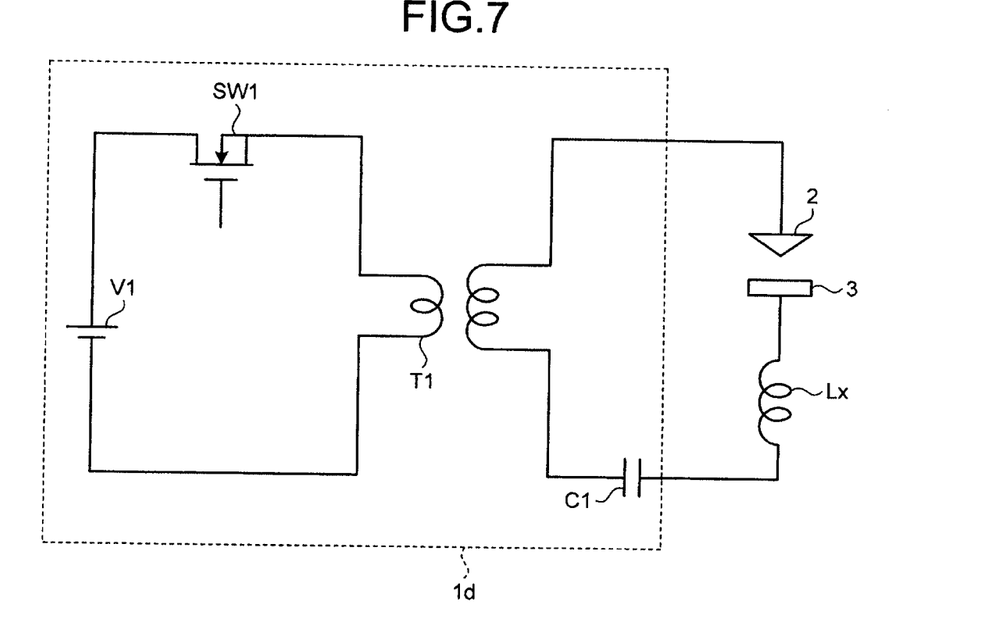
FIG. 7 is a circuit diagram of a configuration of a power supply device for an electrical discharge machine according to a fourth embodiment of the present invention.

FIG. 7 is a circuit diagram of a configuration of a power supply device for an electrical discharge machine according to a fourth embodiment of the present invention. In FIG. 7, constituent elements similar or equivalent to constituent elements shown in FIG. 1 (the first embodiment) are denoted by like reference letters or numerals. Parts relevant to the fourth embodiment are mainly explained below.

As shown in FIG. 7, a power supply device for an electrical discharge machine 1d according to the fourth embodiment is configured, as compared with the configuration shown in FIG. 1 (the first embodiment), so that a transformer T1 is provided in place of the reactor L1. That is, one end of a primary side of the transformer T1 is connected to a positive electrode terminal of the DC power supply V1 via the switching element SW1, and the other end thereof is connected to a negative electrode terminal of the DC power supply. Furthermore, one end of a secondary side of the transformer T1 is connected to a wire electrode 2 and the other end thereof is connected to a workpiece 3 via the capacitor C1.

The transformer T1, similarly to the reactor L1, constitutes, together with a floating capacitance between the electrodes, a resonance circuit. By changing numbers of turns of the primary and secondary sides of the transformer T1 and decreasing the number of turns of the primary side, a voltage of the DC power supply V1 can be reduced. As described in the first to third embodiments, the number of turns of the primary side of the transformer T1 is selected based on a resonance constant of the resonance between the floating capacitance between the electrodes and an inductance component of the transformer T1.

The switching element SW1 operates similarly to that according to the first embodiment. The resonance circuit and the DC power supply V1 can be made more independent of each other because the DC power supply can be isolated by using the transformer T1.

With this configuration, a resonance current generated by the resonance circuit including the inductance of the transformer T1 and the floating capacitance between the electrodes has no effect on the DC power supply V1, and the DC power supply V1 is conversely free from influence of the resonance current. Therefore, it is possible to stably perform finish machining with high surface roughness.

At this time, if the power supply device 1d is assumed in an ideal state without leakage magnetic flux and the like, an equivalent circuit viewed from between the electrodes is equal to FIG. 1. That is, the fourth embodiment can achieve effects identical to those of the first embodiment. In Patent Document 2, the sinusoidal voltage is applied to between the electrodes by the resonance using the AC power supply. In the fourth embodiment, the surface roughness is higher than that in Patent Document 2, because a pulse voltage asymmetric in positive and negative polarities is applied to between the electrodes.

While an example of applying the fourth embodiment to the first embodiment has been described above, the fourth embodiment can be similarly applied to the second embodiment.

Furthermore, a plurality of switching elements connected in parallel can be used in place of the switching element SW1 as described in the third embodiment. Besides, as described in the third embodiment, a reverse-flow prevention diode can be interposed between the positive electrode terminal of the DC power supply and a drain terminal of the switching element SW1 in FIG. 7.

Fifth Embodiment

Figure 8:
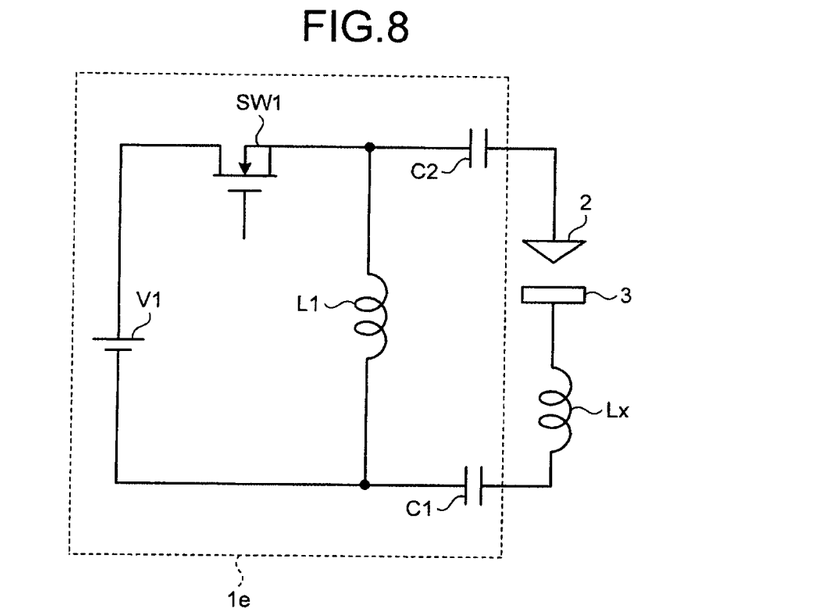
FIG. 8 is a circuit diagram of a configuration of a power supply device for an electrical discharge machine according to a fifth embodiment of the present invention.

FIG. 8 is a circuit diagram of a configuration of a power supply device for an electrical discharge machine according to a fifth embodiment of the present invention. In FIG. 8, constituent elements similar or equivalent to constituent elements shown in FIG. 1 (the first embodiment) are denoted by like reference letters or numerals. Parts relevant to the fifth embodiment are mainly explained below.

As shown in FIG. 8, a power supply device for an electrical discharge machine 1e according to the fifth embodiment is configured, as compared with the configuration shown in FIG. 1 (the first embodiment), so that a capacitor C2 is additionally interposed on a wire electrode 2 side.

The presence of floating impedance (not shown) near between electrodes possibly hampers resonance of the reactor L1 with between the electrodes. In the first to fourth embodiments, it is described that the capacitor C1 deactivates the inductance component (the floating inductance Lx) of the floating impedance. Actually, however, floating capacitance (not shown) is present on each of parallel paths. Due to this, it is considered that resonance occurs between the floating capacitance and the floating inductance Lx. Therefore, in the fifth embodiment, capacitors are interposed in a plurality of portions between the DC power supply V1 and between the electrodes, thereby making it possible to cut off the resonance with the floating capacitance.

A value of the capacitance interposed between the reactor L1 and between the electrodes can be ideally calculated as a value of a combination of capacitance values of the capacitors C1 and C2. Therefore, the capacitance values of the capacitors C1 and C2 can be set arbitrarily. However, when the floating capacitance and the floating inductance Lx are interposed in parallel somewhere on parallel paths, the capacitance value of the capacitor C1 inserted into the path on one side between the electrodes and that of the capacitor C2 inserted on the path on the other side between the electrodes are adjusted to differ from each other. By doing so, a waveform of a voltage applied to between the electrodes can be made more optimal.

Figure 9:
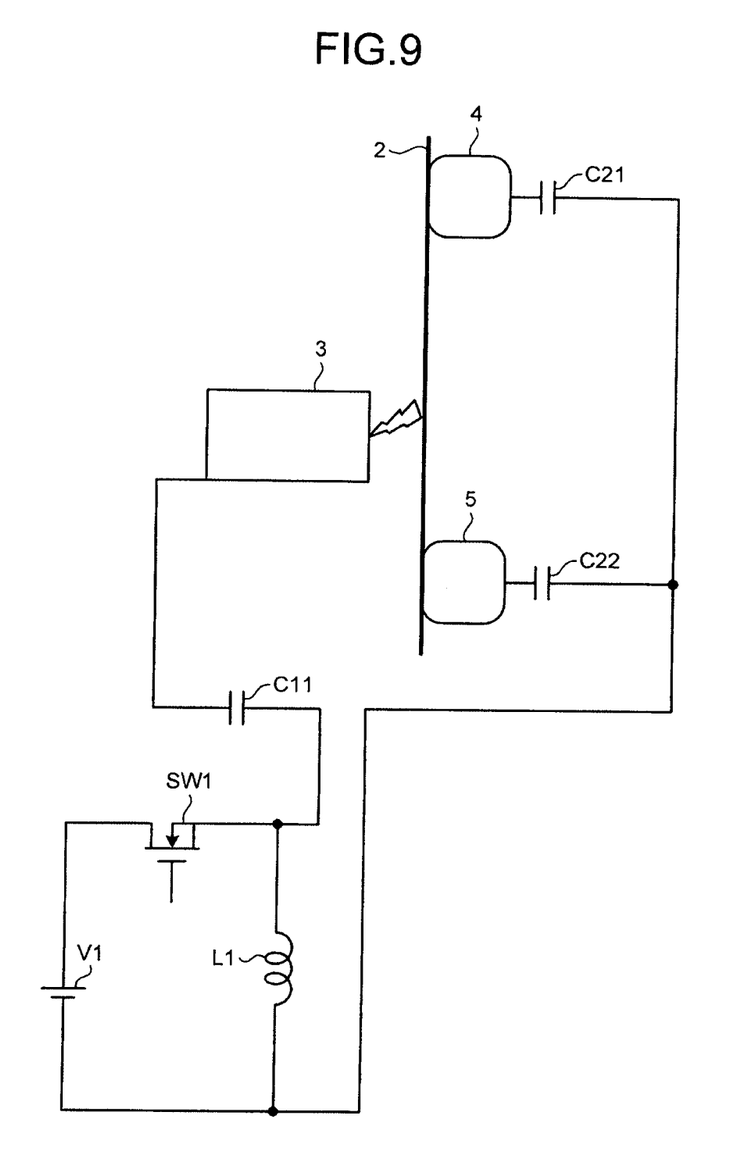
FIG. 9 is an explanatory diagram of a configuration example of a case when the power supply device for an electrical discharge machine shown in FIG. 8 is applied to a wire electric discharge machining device.

A specific example of application is described next with reference to FIG. 9. FIG. 9 is an explanatory diagram of a configuration example of a case when the power supply device for an electrical discharge machine shown in FIG. 8 is applied to a wire electric discharge machining device.

As shown in FIG. 9, in the wire electric discharge machining device, a machining current is supplied to the wire electrode 2 from two portions, that is, upper and lower portions via an upper feeder 4 and a lower feeder 5, respectively. In this case, it is unclear how the floating impedance (not shown in FIG. 9) is interposed and it is considered that a voltage pulse supplied from the upper feeder 4 differs from that supplied from the lower feeder. In this case, a failure such as a fall in an applied voltage possibly occurs.

Considering the possibility, capacitors C21 and C22 corresponding to the capacitor C2 are inserted in series near the two feeder points, respectively and the waveforms are adjusted, thereby making it possible to create an optimum high-frequency waveform. Moreover, by inserting a capacitor C11 corresponding to the capacitor C1 near the workpiece 3, it is possible to create the optimum high-frequency waveform.

While an example of applying the fifth embodiment to the first embodiment has been described above, the fifth embodiment can be similarly applied to the second to fourth embodiments.

Sixth Embodiment

Figure 10:
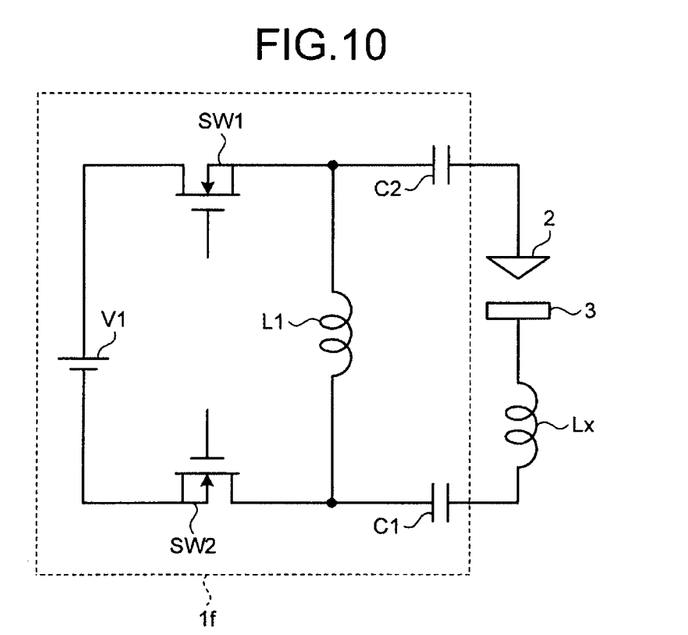
FIG. 10 is a circuit diagram of a configuration of a power supply device for an electrical discharge machine according to a sixth embodiment of the present invention.

FIG. 10 is a circuit diagram of a configuration of a power supply device for an electrical discharge machine according to a sixth embodiment of the present invention. In FIG. 10, constituent elements similar or equivalent to constituent elements shown in FIG. 8 (the fifth embodiment) are denoted by like reference letters or numerals. Parts relevant to the sixth embodiment are mainly explained below.

As shown in FIG. 10, a power supply device for an electrical discharge machine 1f according to the sixth embodiment is configured, as compared with the configuration shown in FIG. 8 (the fifth embodiment), so that the switching element SW2 is additionally provided on a path on a negative electrode side of the DC power supply V1.

It is desirable that an inter-electrode voltage is in the form of a short pulse for ensuring high frequency and is high for achieving sufficient machining capability. Measures that satisfy these requirements are to accelerate the switching element from viewpoints of the power supply side.

Therefore, in the sixth embodiment, the switching elements SW1 and SW2 are provided on paths on both of positive and negative electrode sides of the DC power supply V1, respectively as shown in FIG. 10. By turning on or off the both switching elements SW1 and SW2 simultaneously, the DC power supply V1 can be quickly connected to or cut off from the reactor L1 and an excitation voltage generated in the reactor L1 can be increased. This can make the voltage generated between the electrodes a high voltage in the form of a short pulse and ensure higher machining surface accuracy.

While an example of applying the sixth embodiment to the fifth embodiment has been described above, the sixth embodiment can be similarly applied to the first to fourth embodiments.

INDUSTRIAL APPLICABILITY

As described above, the power supply device for an electrical discharge machine according to the present invention is useful as a power supply device for an electrical discharge machine that can stably perform finish machining with high surface roughness.

The invention claimed is:

1. A power supply device for an electrical discharge machine for applying a pulse voltage to between electrodes constituted by an electrode and a workpiece, respectively, the power supply device comprising:
  a direct-current power supply;
  a capacitor connected in series between the electrodes;
  a reactor connected in parallel with a first serial circuit, and having one end connected to one end of the direct-current power supply, the first serial circuit being constituted by the electrodes and the capacitor; and
  a first switching element having one end connected to other end of the direct-current power supply and other end connected to other end of the reactor.

2. The power supply device for an electrical discharge machine according to claim 1, wherein
  a second switching element is provided between one end of the direct-current power supply and one end of the reactor.

3. The power supply device for an electrical discharge machine according to claim 1, wherein
  a plurality of capacitors are connected in series between the electrodes.

4. The power supply device for an electrical discharge machine according to claim 1, wherein
  a second switching element is provided between one end of the direct-current power supply and one end of the reactor, and
  a plurality of capacitors are connected in series between the electrodes.

5. The power supply device for an electrical discharge machine according to claim 1, wherein
  the first switching element includes a plurality of switching elements connected in parallel, and
  control signals are supplied to control terminals of the plurality of switching elements, respectively, the control signals controlling the switching elements to be turned on or off in a predetermined order.

6. The power supply device for an electrical discharge machine according to claim 1, wherein
  the first switching element includes a plurality of switching elements connected in parallel, and
  the switching elements are controlled to differ from one another in an ON-time width or an OFF-time width.

7. The power supply device for an electrical discharge machine according to claim 1, wherein
  a second serial circuit including an inductive load, which constitutes a resonance circuit with a floating capacitor between the electrodes, and a capacitive load is connected between the electrodes.

8. The power supply device for an electrical discharge machine according to claim 1, wherein
  the capacitor is a coaxial cable or comprises an insulator.

9. The power supply device for an electrical discharge machine according to claim 1, wherein
 a second serial circuit including an inductive load, which constitutes a resonance circuit with a floating capacitor between the electrodes, and a capacitive load is connected between the electrodes, and
 the inductive load is a floating inductance present on a voltage supply path to the reactor or to between the electrodes.

10. The power supply device for an electrical discharge machine according to claim 1, wherein
 a second serial circuit including an inductive load, which constitutes a resonance circuit with a floating capacitor between the electrodes, and a capacitive load is connected between the electrodes, and
 the capacitive load is another power supply device completed with an operation for applying a voltage to between the electrodes.

11. A power supply device for an electrical discharge machine for applying a pulse voltage to between electrodes constituted by an electrode and a workpiece, respectively, the power supply device comprising:
 a direct-current power supply;
 a capacitor connected in series between the electrodes;
 a transformer, one end of a primary side of the transformer being connected to one end of the direct-current power supply, a secondary side of the transformer being connected to both ends of a first serial circuit constituted by the electrodes and the capacitor; and
 a first switching element having one end connected to other end of the direct-current power supply and another end of the first switching element being connected to other end of the primary side of the transformer.

12. The power supply device for an electrical discharge machine according to claim 11, wherein
 a second switching element is provided between one end of the direct-current power supply and one end of the primary side of the transformer.

13. The power supply device for an electrical discharge machine according to claim 11, wherein
 a plurality of capacitors are provided in series between the electrodes.

14. The power supply device for an electrical discharge machine according to claim 11, wherein
 a second switching element is provided between one end of the direct-current power supply and one end of the primary side of the transformer, and
 a plurality of capacitors are provided in series between the electrodes.

15. The power supply device for an electrical discharge machine according to claim 11, wherein
 the first switching element includes a plurality of switching elements connected in parallel, and
 control signals are supplied to control terminals of the plurality of switching elements, respectively, the control signals controlling the switching elements to be turned on or off in a predetermined order.

16. The power supply device for an electrical discharge machine according to claim 11, wherein
 the first switching element includes a plurality of switching elements connected in parallel, and
 the switching elements are controlled to differ from one another in an ON-time width or an OFF-time width.

17. The power supply device for an electrical discharge machine according to claim 11, wherein
 a second serial circuit including an inductive load, which constitutes a resonance circuit with a floating capacitor between the electrodes, and a capacitive load is connected between the electrodes.

18. The power supply device for an electrical discharge machine according to claim 11, wherein
 the capacitor is a coaxial cable or comprises an insulator.

19. The power supply device for an electrical discharge machine according to claim 11, wherein
 a second serial circuit including an inductive load, which constitutes a resonance circuit with a floating capacitor between the electrodes, and a capacitive load is connected between the electrodes, and
 the inductive load is a floating inductance present on a voltage supply path to the reactor or to between the electrodes.

20. The power supply device for an electrical discharge machine according to claim 11, wherein
 a second serial circuit including an inductive load, which constitutes a resonance circuit with a floating capacitor between the electrodes, and a capacitive load is connected between the electrodes, and
 the capacitive load is another power supply device completed with an operation for applying a voltage to between the electrodes.

* * * * *